(12) United States Patent
Dooies et al.

(10) Patent No.: US 9,384,862 B2
(45) Date of Patent: Jul. 5, 2016

(54) METHOD OF FABRICATING LIQUID-METAL COOLANTS FOR NUCLEAR REACTORS

(75) Inventors: Brett J. Dooies, Wilmington, NC (US); Eric P. Loewen, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 759 days.

(21) Appl. No.: 13/530,356

(22) Filed: Jun. 22, 2012

(65) Prior Publication Data
US 2013/0341555 A1 Dec. 26, 2013

(51) Int. Cl.
| | |
|---|---|
| G21C 9/00 | (2006.01) |
| G21C 7/22 | (2006.01) |
| G21C 7/24 | (2006.01) |
| G21C 15/28 | (2006.01) |
| G21C 17/025 | (2006.01) |
| G21D 3/08 | (2006.01) |

(52) U.S. Cl.
CPC .. *G21C 7/22* (2013.01); *G21C 7/24* (2013.01); *G21C 15/28* (2013.01); *G21C 17/025* (2013.01); *G21D 3/08* (2013.01); *Y02E 30/35* (2013.01); *Y02E 30/39* (2013.01)

(58) Field of Classification Search
None
See application file for complete search history.

(56) References Cited

U.S. PATENT DOCUMENTS

| | | | | | |
|---|---|---|---|---|---|
| 3,989,945 | A | * | 11/1976 | Cooper | G21C 17/025 250/303 |
| 6,724,854 | B1 | * | 4/2004 | Kim | G21C 17/0225 376/306 |
| 2003/0194345 | A1 | * | 10/2003 | Loewen | F28D 15/00 422/9 |
| 2005/0269547 | A1 | | 12/2005 | Ohira | |
| 2006/0037434 | A1 | | 2/2006 | Bonnemann et al. | |
| 2010/0290577 | A1 | * | 11/2010 | Baney | G21C 15/28 376/306 |
| 2010/0322828 | A1 | * | 12/2010 | Toda | B22F 1/0022 422/186 |
| 2011/0210285 | A1 | * | 9/2011 | Ara et al. | 252/71 |

FOREIGN PATENT DOCUMENTS

| | | |
|---|---|---|
| CN | 101853707 A | 10/2010 |
| JP | 2011220731 A | 11/2011 |

OTHER PUBLICATIONS

PCT Search Report issued in connection with corresponding WO Patent Application No. US2013/043622 dated on Sep. 4, 2013.
Saito et al., "A Study of Atomic Interaction Between Suspended Nanoparticles and Sodium Atoms in Liquid Sodium," Nuclear Engineering and Design 240 (2010) pp. 2664-2673.
Awasthi et al., "An Assessment of Solubility of Some Transition Metals (Fe, Ni, Mn, and Cr) in Liquid Sodium," Journal of Nuclear Marerials 116 (1983) pp. 103-111.
Ohhira et al., "Dispersion Behavior of Nanometer-Sized Metalic Particles in Liquid Sodium," Transactions of the American Nuclear Society 91 (2004) pp. 219-220.
Lee, et al. "Feasibility study on molten gallium with suspended nanoparticles for nuclear coolant applications," Nuclear Engineering and Design, vol. 247, pp. 147-159, (2012).
Hadad, et al. "Neutronic study of nanofluids application to VVER-1000," Annals of Nuclear Energy, vol. 37, pp. 1447-1455, (2010).
Chinese Office Action dated Dec. 28, 2015 corresponding to Chinese Application No. 201380032522.3.

* cited by examiner

*Primary Examiner* — Marshall O'Connor
(74) *Attorney, Agent, or Firm* — Harness, Dickey & Pierce, P.L.C.

(57) ABSTRACT

A method of fabricating a liquid-metal coolant includes adding nanoparticles to the liquid-metal coolant to change neutronic properties of the liquid-metal coolant. The nanoparticles have neutronic properties different from that of the liquid-metal coolant.

9 Claims, 1 Drawing Sheet

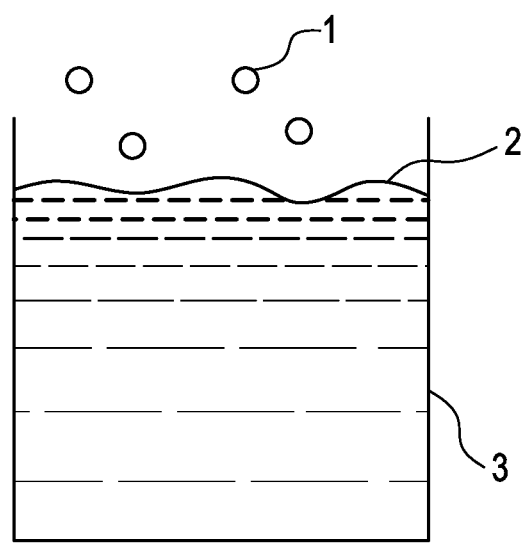

METHOD OF FABRICATING LIQUID-METAL COOLANTS FOR NUCLEAR REACTORS

BACKGROUND

1. Field

Some example embodiments relate generally to methods of fabricating liquid-metal coolants, and more particularly, to a method of altering neutronic properties of liquid-metal coolants by adding metallic nanoparticles.

2. Related Art

Nuclear reactors use a wide variety of coolants, and fast reactors utilize a fission chain reaction that is sustained by fast neutrons. Liquid metal coolants (e.g., lead or sodium) are used in fast reactors, because these types of coolants do not significantly impact or moderate neutrons. However, a sodium coolant, for example, burns when exposed to air, and is corrosive, thereby resulting in safety issues.

SUMMARY

Example embodiments provide a method of fabricating a liquid-metal coolant that enhances the reactor coolant performance, energy efficiency and/or fuel performance of the nuclear reactor. The method includes adding nanoparticles to the liquid-metal coolant to change neutronic properties of the liquid-metal coolant. The nanoparticles have neutronic properties different from that of the liquid-metal coolant.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 1 is a flow diagram of a method of fabricating a liquid-metal coolant, in accordance with an example embodiment.

DETAILED DESCRIPTION

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the FIGURES.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGURES. For example, two FIGURES shown in succession may in fact be executed substantially concurrently or may sometimes be executed in the reverse order, depending upon the functionality/acts involved.

FIG. 1 is a schematic view of a method of fabricating a liquid-metal coolant, in accordance with an example embodiment. A container 3 includes a liquid metal coolant 2, and nanoparticles 1 are added thereto. The container 3 may be a conventional primary coolant system of a reactor or an isolated pipe or vessel. Nanoparticles 1 are added to a liquid metal coolant 2 in order to change its neutronic properties.

The nanoparticles 1 have neutronic properties (e.g., neutron absorption, neutron moderation, etc.) different from that of the liquid-metal coolant 2. The neutronic properties (which will be described in more detail below) may include one of neutron absorption cross-section that is measured in barns or units of $10^{-24}$ cm$^2$, neutron moderation characteristics that is measured by a mean lethargy gain of a neutron in a collision with a moderator atom, and a neutron scattering cross-section that is measured in barns.

The nanoparticles 1 may be dispersed into the liquid-metal coolant 2 at about 350° C. The diameter of the nanoparticles 1 may be about 10-50 nm. The resultant solution may be maintained at the same temperature for about 24 hours. Example embodiments are not limited thereto, and the aforementioned conditions may vary based on the metal of the nanoparticles.

The nanoparticles include a metal with at least one of a neutron cross-section and an atomic weight different from a metal of the liquid-metal coolant. For example, the metal included in the nanoparticles may be one of hafnium, boron, iron, nickel, manganese, chromium, and gadolinium (e.g., hafnium). The metal of the liquid-metal coolant is one of, for example, liquid sodium, lead-bismuth or sodium-potassium.

A concentration of the nanoparticles 1 present in the liquid-metal coolant 2 may be measured by one of several methods, e.g., direct or continuous on-line methods. For example, the concentration of the nanoparticles 1 can be measured directly by sampling the liquid-metal coolant 2 by a chemical means, e.g., using a mass spectrometer.

A concentration of the nanoparticles 1 present in the liquid-metal coolant 2 may be measured continuously by, for example, measuring the intensity of a gamma signal in the coolant based on an activation product of the nanoparticles 1. For example, measuring the intensity of a 482 keV gamma signal from the decay of the metal present in the nanoparticles 1, e.g., Hf-181, allows for a measurement of the Hf content in the liquid-metal coolant 2.

In a method according to an example embodiment, nanoparticles 1 (e.g., hafnium) with a higher neutron absorption cross-section than a metal of the liquid-metal coolant 2 (e.g., liquid-sodium coolant) are added to the liquid-metal coolant 2. The effective neutron absorption cross-section of the resulting dispersion is a combination of the liquid sodium absorption cross-section and the metallic nanoparticle absorption cross-section, weighted by the number of atoms of each present in the dispersion. In an example embodiment, the effective neutron absorption cross-section increases proportionally with the concentration of the nanoparticles 1 in the liquid-metal coolant 2.

In an example embodiment, the nanoparticles 1 may be added to or removed from the liquid-metal coolant 2 gradually in order to control the effective neutron absorption cross-section of the dispersion.

In an example embodiment, the nanoparticles 1 do not necessarily dissolve in the liquid-metal coolant 2, but the effect on the neutron absorption characteristics of the liquid-metal coolant 2 is the same, providing control of the dispersion reactivity separate from normal operations, e.g., control rod insertion and removal.

In an example embodiment, the nanoparticles 1 may be added to the liquid-metal coolant 2 relatively quickly in a relatively high concentration. This addition of the nanoparticles 1 may be actively actuated, or may be achieved passively when a design threshold of a reactor is reached (e.g., if the coolant temperature goes above a desirable threshold then the nanoparticles are added automatically).

The addition of the nanoparticles 1 may also provide a relatively immediate and large negative reactivity to the dispersion, thereby increasing the effective neutron absorption cross-section sufficiently to stop the fission chain reaction within a reactor core. This effect is similar to the Standby Liquid Control System present in Boiling Water Reactors (BWRs), which adds boric acid into solution in the reactor core in order to stop a fission chain reaction.

In an example embodiment, the nanoparticles 1 do not necessarily dissolve in the liquid-metal coolant 2, but the effect on the neutron absorption characteristics of the liquid-metal coolant 2 is the same, providing a dispersion that can shut down a reactor, but separate from normal operations, e.g., control rod insertion and removal.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of fabricating a liquid-metal coolant for a nuclear reactor, the method comprising:
   adding nanoparticles to the liquid-metal coolant to change neutronic properties of the liquid-metal coolant,
   the nanoparticles including a metal having neutronic properties different from that of the liquid-metal coolant prior to the adding nanoparticles, the metal including one of hafnium, boron and gadolinium.

2. The method of claim 1, wherein the adding nanoparticles includes adding the metal having the neutronic properties including at least one of a neutron cross-section and an atomic weight different from a metal of the liquid-metal coolant.

3. The method of claim 2, wherein the adding a metal to the liquid-metal coolant includes adding the metal to one of a liquid sodium coolant, a lead-bismuth coolant and a sodium-potassium coolant.

4. The method of claim 1, wherein the neutronic properties include one of neutron absorption cross-section, neutron moderation characteristics, and a neutron scattering cross-section.

5. The method of claim 1, wherein the adding nanoparticles includes measuring a concentration of the nanoparticles by one of direct methods and continuous on-line methods.

6. The method of claim 5, wherein the measuring a concentration of the nanoparticles includes sampling the liquid-metal coolant using a mass spectrometer.

7. The method of claim 5, wherein the measuring a concentration of the nanoparticles includes measuring intensity of a gamma signal from decay of a metal present in the nanoparticles to determine the content of the metal in the liquid-metal coolant.

8. The method of claim 1, wherein the metal includes one of boron and gadolinium.

9. The method of claim 1, wherein the nanoparticles consist essentially of the metal.

* * * * *